Jan. 2, 1973  K. SEIFFERT  3,708,565
PROCESS FOR THE PRODUCTION OF FIBERS FROM
THERMOPLASTIC SYNTHETIC MATERIAL
Filed Aug. 7, 1970

INVENTOR
KARLHEINZ SEIFFERT

BY Brady, O'Boyle & Gates

ATTORNEYS

United States Patent Office 3,708,565
Patented Jan. 2, 1973

3,708,565
PROCESS FOR THE PRODUCTION OF FIBERS FROM THERMOPLASTIC SYNTHETIC MATERIAL
Karlheinz Seiffert, Apartado 64, Carretera de Pego, Benidorm, Spain
Continuation-in-part of application Ser. No. 684,778, Nov. 21, 1967. This application Aug. 7, 1970, Ser. No. 62,076
Claims priority, application Germany, Nov. 21, 1966, S 107,049
Int. Cl. B29c 17/02, 24/00; B29d 7/14
U.S. Cl. 264—88
9 Claims

ABSTRACT OF THE DISCLOSURE

A process for the production of fur-like fibers on a flexible surface in which a continuous film or layer of thermoplastic synthetic material, of the type which becomes viscid when sufficiently heated, is heated to the viscid temperature, is thereafter adhered to a flexible surface and pulled away from the surface to pull a plurality of fiber-like projections outwardly from the layer at substantially right angles to the traveling direction of the flexible surface to form a multiplicity of fibrils, resembling fur, on the flexible surface. The process of the invention exhibits surprisingly good results when an inert gaseous medium is fed under pressure to the fibrils of the thermoplastic material during the formation of the fiber-like projections to simultaneously effect cooling and tensioning of the fibrils to impart further lengthening of the inner ends of the fibrils and separation of the fibrils from the heated roll.

CROSS-REFERENCE TO RELATED APPLICATION

This application is a continuation-in-part of my copending application Ser. No. 684,778, filed Nov. 21, 1967, for Process for the Production of Fibers from Thermoplastic Synthetic Material now abandoned.

BACKGROUND OF THE INVENTION

This invention relates to a process for the manufacture of fur-like fibrils on a surface from thermoplastic synthetic material, which process is distinguished by its versatile applicability and the low costs of the synthetic fur-like product produced thereby. The known prior art processes for producing similar synthetic fur-like material are very costly as opposed to the relatively simple process of the present invention.

SUMMARY OF THE INVENTION

An apparatus for carrying out the process of the invention consists, for example, of two rotating carrier surfaces, such as rolls or conveyor surfaces, which diverge from each other in the transformation phase of the thermoplastic synthetic material from the molten or viscid state to the solid state when the fiber-like projections or fibrils are formed, there being simultaneously introduced between the fibrils thus formed in this phase a cool inert gaseous medium under pressure.

It has been found that the substrates of the moving carriers or the surfaces of the rolls for forming the fibrils, in order to provide the best results should be provided with a non-adhesive coating, such as silicon or "Teflon" (tetrafluoroethylene fluorocarbon resins or fluorinated ethylenepropylene resins). These compounds are resistant to the melted, sticky or viscid state of the thermoplastics employed most frequently which are suitable for formation of fur-like fibrils over an entire surface of textile material or the like, and at the same time function so that no residues remain on the roll surfaces beyond the transformation phase, since there is only slight adhesion between the roll surface and the molten thermoplastic material. One of the two carrier surfaces is preferably a flat substrate such as, for example, textile material, paper, flexible synthetic foam material, or higher-melting foils, to which the fiber nap tightly adheres.

Particularly suitable thermoplastics for the manufacture of the fur-like fibrils over an entire surface area, according to the process of the invention, have been found to be, e.g., polyvinyl acetate, vinyl acetate/ethylene copolymers, polypropylene and polyethylene of a higher melt index. However, polyamides, copolyamides, polyurethanes, and furthermore PVC-soft and copolymerizates have also proved to be usable. Basically, all fiber-producing polymerizates, polycondensates, and polyadducts, the melts of which are not very viscous, and which get viscid when sufficiently heated, are suitable.

The thickness of the plastic layer or the melt is dependent upon the desired fiber length and fiber diameter. Such thickness can range, for example, between 0.05 and 0.25 mm. in the manufacture of fur-like fibers and fleece, but when producing flat articles having a fibrous surface thereon, this thickness can be even greater.

A suitable driving speed for the moving carrier or roll surfaces has been found to be 2–5 meters per minute. In this connection, however, the driving speed is dependent upon the thickness of the thermoplastic film and the length of fibrils that is desired.

Generally, in the process of the invention, the thermoplastic material is heated to a temperature at least 10° C. higher than the melting point of the material and the length of the fur-like fibers or fibrils is predominantly determined by the angle at which the textile or carrier strip departs from the heated roll, and the pressure of the cooling air stream. As the separation angle between the roll and strip decreases the fibrils become shorter in length, and as the pressure of the cooling air stream increases the fibrils also become shorter in length as well as thicker or larger in diameter. Thus longer fibrils are obtained by increasing the separation angle and reducing the pressure of the cooling air stream. An optimum pressure has been found to be 1.5 atmospheres. Thinner fibers are obtained by increasing the temperature of the roll in contact with the thermoplastic material, and/or decreasing the speed of the rolls so that the thermoplastic material remains in contact with the heated roll for a longer period and thus gets heated to a higher temperature. It can thus be appreciated that to obtain a fur-like product having fibrils of a certain predetermined length there are several variables in the process that must be adjusted for the particular thermoplastic material being used.

DESCRIPTION OF THE PREFERRED EMBODIMENTS

Figure 1:
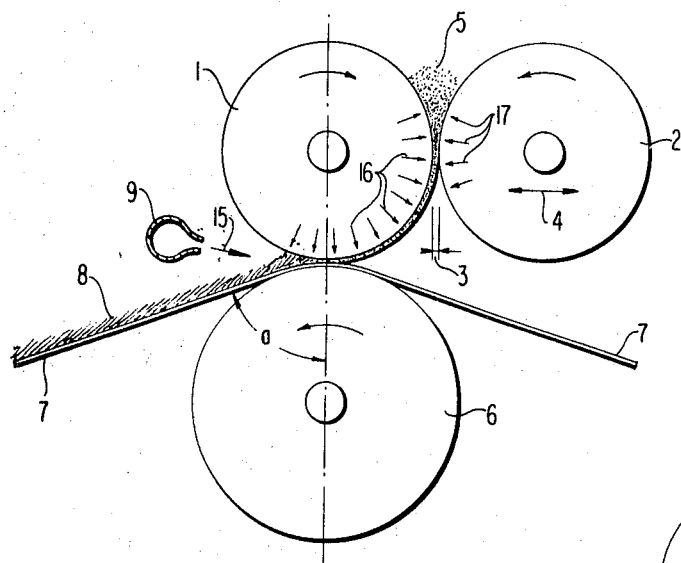
FIG. 1 is a schematic side view showing exemplary apparatus for the manufacture of synthetic fibers on a carrier layer according to the process of the present invention.

Referring to FIG. 1, of the drawings, a film of a thermoplastic material or a plastic melt obtained by an extrusion or roll melt process, indicated generally at 5, is introduced between two counter-rotating surfaces 1 and 2 in the form of rolls. This apparatus can also be employed directly in a polymerization autoclave. By heating the rolls 1 and 2, as indicated at 16 and 17, to the melting temperature of the raw granulated thermoplastic material 5, by means well known in the art, a congealing of the plastic melt is prevented. Heated roll 2 is laterally adjustable toward and away from heated roll 1, as indicated by arrow 4, to selectively adjust the width of the spacing 3 between the rolls 1 and 2 and thus the thickness of the layer of melted thermoplastic material on heated roll 1, to be able to produce fibrils of varying lengths on the flexible surface 7.

In order to produce a fibrous or fur-like surface on any desired flexible flat body portion or flexible sheet-like article, the flexible carrier layer or surface 7 is replaced by the desired flexible flat article and passed between the counter-rotating rolls 1 and 6. However, for the purpose of describing the invention, the description will be limited to forming a fur-like surface on a flexible surface 7 which is preferably comprised of a strip of textile material, such as cloth or a strip of synthetic flexible foam plastic material having a thickness in the range of but not limited to $\frac{1}{16}$ to $\frac{3}{16}$ inch. The flexible carrier surface 7 which forms a backing for the fur-like material, may for instance be two meters in width, but it is understood that the process is not limited to any particular width.

A pressure roll 6 is located beneath roll 1, along the same vertical axis, and rotates in a direction counter to roll 1, namely counterclockwise, and functions to draw the flexible carrier surface 7 between the heated roll 1 and pressure roll 6. The synthetic thermoplastic material 5, such as polypropylene, polyethylene, or the other materials previously mentioned, which must be flexible at normal temperatures of between approximately $-20°$ C. and $+70°$ C., is brought to its melting point by the heated rolls 1 and 2, then forms a film or coating along the entire length of roll 1 having a thickness determined by the spacing 3 between rolls 1 and 2. The thickness of the coating is adjusted according to the thickness and length of fibrils desired from the particular thermoplastic material, but a layer of 20–30 g./m.$^2$ or .05 to .25 mm. thick has been found to be thick enough to produce fur-like fibrils having lengths in the range of 0.5–1.5 cm. over the entire surface 7. As the layer of melted thermoplastic material travels clockwise on roll 1 by rotation of the roll it is further heated by the heating means 16 until it is moved into contact with the flexible or textile surface 7. At this point the temperature of the thermoplastic material is preferably at least 10° C. higher than the melting point of the material.

Rolls 1 and 6 are spaced apart a sufficient distance so that there is still some free space between the flexible surface 7 and roll 1 to accommodate a thin layer of thermoplastic material. Pressure roll 6 can be adjusted vertically to adjust this spacing, if desired. The counter-rotating rolls 1 and 6 thus bring the molten thermoplastic material into good linear contact with the flexible surface or textile strip 7, to coat the surface throughout the width thereof with a layer of melted thermoplastic material having a good bond with the surface 7. Since the thermoplastic material has reached a temperature above its melting point that is high enough to create fibers or fibrils when it is drawn apart form the surface 7, a multiplicity of fibrils 8 are formed on the flexible surface 7 as the coated surface is separated from the heated roll 1.

The material chosen for the surfaces of the heated rolls 1 and 2 is dependent upon the thermoplastic material used. For fur-like material formed from polyolefine a roll with a surface layer of Teflon (tetrafluorethylene) has been found preferable. For other thermoplastic materials, rolls with a layer of hard chrome have been found very effective. These surfacing materials are resistant to the melted and sticky thermoplastic with which they are used and there is such slight adhesion between the rolls and the thermoplastic that no plastic residue is left on the rolls after the fibrils are stripped from the roll surface. Rolls with an uneven surface, as for instance with a surface of sintered iron or a surface, like a fine sieve, produce no fibers or fibrils.

Figure 2:
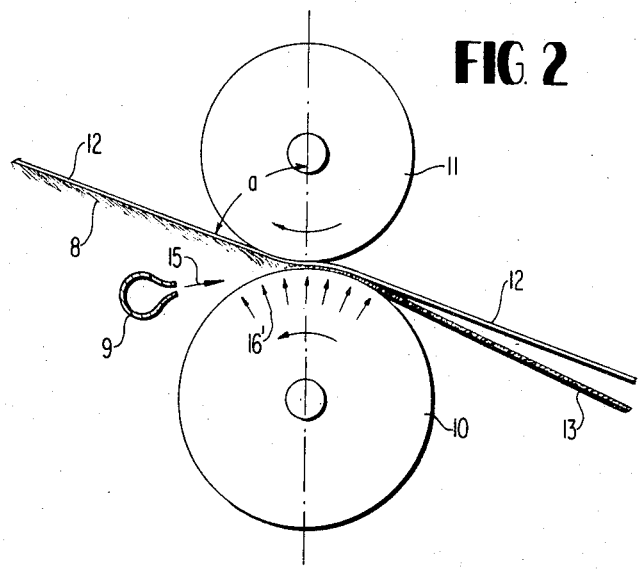
FIG. 2 is a schematic view, similar to FIG. 1, showing a modified form of exemplary apparatus for carrying out the process of the invention.

A modified form of the exemplary apparatus for practicing the process of the invention is illustrated in FIG. 2. In this form of the apparatus a single heated roll 10 is connected adjacent a pressure roll 11, in counter-rotating relation, similar to the rolls 1 and 6 respectively. In this form of the process a film 13 of thermoplastic material, having a predetermined thickness and a width as great as flexible surface 12, corresponding to the surface 7 to which the film 13 is to be adhered, is convergingly fed concurrently with the flexible surface toward and gripped between the pressure roll 11 and heated roll 10, heated by the heating means 16'. The film 13 of thermoplastic material is used in lieu of the granulated thermoplastic material 5 in FIG. 1. The thermoplastic film 13 moves into contact with the surface of heating roll 10, is heated to approximately 10° C. above the melting point of the thermoplastic film 13 and is adhered to the flexible surface 12 by the rolls 10 and 11. As the flexible surface 12 moves away from the rolls, after passing through them, the heated roll 10, because of the slight affinity or adhesion between the melted thermoplastic material and the surface of the roll, pulls a multiplicity of fur-like fibrils 8 from the sticky surface of member 12 substantially at right angles thereto as the surface separates from heated roll 10, as the two rolls 10 and 11 diverge from each other.

Figure 3:
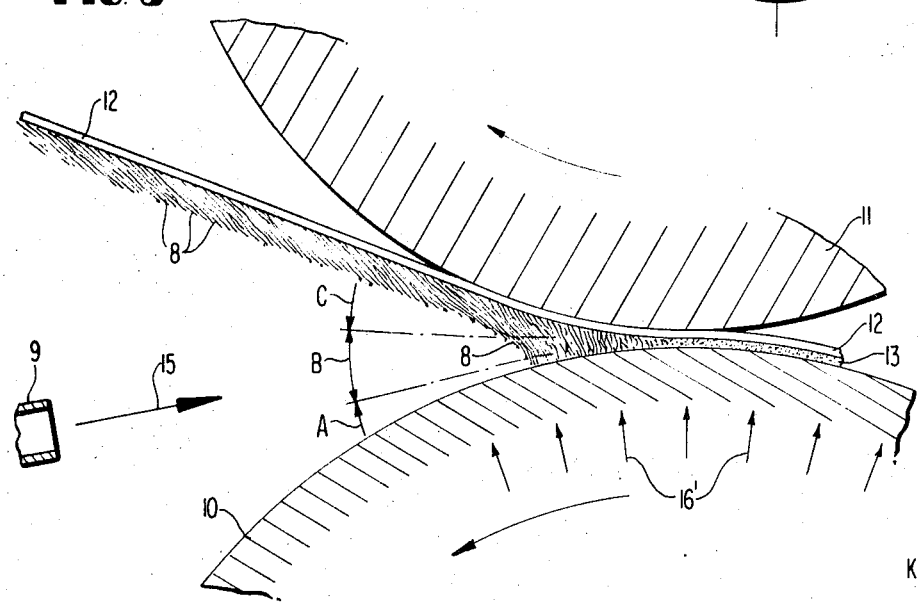
FIG. 3 is a schematic view, of a fragmentary portion of FIG. 2, on an enlarged scale, illustrating the manner in which fur-like fibrils are produced on a carrier surface or strip and the manner in which the cooling air stream acts on the fibrils when employing the process according to the invention.

While FIG. 3 illustrates an enlarged fragmentary portion of FIG. 2, it discloses the fibril forming and separation stage of both the processes shown in FIGS. 1 and 2, so it is to be understood that the following description is applicable to the apparatus shown in both FIGS. 1 and 2. A nozzle 9 having a nozzle opening approximately 2 mm. in width, and of a length of substantially the same as the width of the flexible surface 12, is positioned on the exit side of the rolls to direct a cooling stream 15 of inert gaseous medium, preferably air, on the fibrils or fur-like fibers 8 pulled from the melted thermoplastic layer on the flexible backing 12 by the heated roll 1 or 10, respectively. To form fur-like fibrils on the flexible backing layer 12, it has been found that air at 1.5 atmospheres pressure and a temperature of approximately 20° C. (68° F.) produces excellent results.

The flexible backing surface 12 leaves the pressure roll 6 or 11, respectively, at an angle $a$, called the separation angle, and is the angle subscribed by flexible material 12 and the vertical plane in which the rotation axes of the heated and pressure rolls lie. As the angle between the heated roll and the flexible surface 12 increases, the length of the fibrils increases. The cooling air stream 15 is directed between the rolls where the fibrils are being formed at an angle of approximately 25–45° relative to the flexible surface 12 and preferably at an angle of approximately 30°.

Cooling air stream 15 enables fibrils of greater length to be obtained than have heretofore been possible in other processes, to thus provide a fur-like surface on the flexible carrier layer or surface 12. The length of the fur-like fibrils as shown in FIG. 3 can be divided into three portions, designated A for the end portion that is attached to the heated roll; B for the medial portion and C for the base portion that is affixed to the carrier surface 12. The air stream functions on portions A and B of the fibrils, that is the outer and medial portions of the fibrils, and tends to cool these outer portions, so that during formation of the fibrils portion C adjacent the surface 12 is less viscose than portion B because the ends of the previously stripped fibrils insulate this portion of the fibrils from the air stream and the insulating value of the material of surface 12 combines to maintain portion C in a slightly molten state for further elongation of the fibrils. Portion A connected to the heated roll is less viscose than portion B, because it is still connected to the heated roll. Portion B of the fibrils is therefore cooled first by the air stream and the pressure of the stream tugs on every single fibril, back and forth, and pulls and separates them from the heated surface 10 as the stream makes the ends of the fibrils somewhat brittle for easy separation. During this process the medial portions B of the fur-like fibers are cooled while portions C remain somewhat molten and since the fibrils are under tension while being stripped from the heated roll, portions C are elongated further with the result that the fur-like fibers have approximately the same diameter throughout the lengths thereof and are not substantially thicker at the base portions C as in other processes.

The cooling air stream produces a sufficient cooling of the fibrils so that the finished product can be reeled-up a relatively short distance from the separation stage, in the conventional manner.

In the separation stage certain thermoplastics exhibit only a minor affinity to the surface of the heated roll when the material is cooled to below the melting temperature and this function, in combination with the turbulence imparted to each fiber by the air stream, aids in separating the fiber ends from the heated roll. Finer and thinner fibers are produced from thermoplastic material having a lower melting point, and those which also have a low viscosity in the molten state. Thinner fibers are also obtained by increasing the temperature of the rolls 1, 2 and 10 and/or by decreasing the velocity of the rolls to maintain the thermoplastic material in contact with the heated roll for a longer period of time, to thus increase its temperature.

The following are examples of fur-like material manufactured according to the process of the invention:

EXAMPLE 1

Polypropylene with a melting point of 170° C. to 175° C. was heated by the rolls 1 and 2 to a temperature of 190° C. and guided between the rolls 1 and 6, the rolls having a velocity of 4 to 5 meters per minute. Air was used as the cooling gaseous medium at a temperature of 20° C. (68° F.) and 1.5 atmospheres pressure. The angle $a$ of FIG. 1 was chosen at 45° C. The opening of the air nozzle was 2000 mm. length and 2 mm. breadth. Surface 7 was a 3/16 inch thick strip of synthetic foam plastic material and a fur-like surface was produced on this surface having fibrils 1 cm. to 1.5 cm. in length.

EXAMPLE 2

Polypropylene as used in Example 1 was heated only to 185° C. and the velocity of the rolls 1, 2, 6 was raised to 5.5 m./min. The angle $a$ was decreased to 35°. The rest of the conditions were the same as those in Example 1. The result was a fur-like surface having fibrils .5 to .75 cm. in length and having a different feeling to the touch than Example 1.

EXAMPLE 3

Polyethylene with a melting point of 115° C. was heated by the rolls 1 and 2 up to 145° C. The velocity of the rolls 1, 2, 6 was reduced to 3.5 m./min. The air pressure was 1.2 atmospheres. The angle $a$ was 45°. The other conditions were like those in Example 1. The result shows sample 3. Surface 7 was textile fabric and a fur-like surface was produced on the fabric having fibrils .7 to 1.1 cm. in length which was very soft to the touch.

EXAMPLE 4

Polyethylene with a melting point of 115° C. was heated by the rolls 1 and 2 up to 140° C. The other conditions correspond to those in Example 3, except that the process was run with a carrier surface 7 of 1/16" thick synthetic foam plastic material and then with a textile fabric. A fur-like surface having fibrils of 1.1 to 1.5 cm. in length was produced on each surface.

Finer and shorter fibers were produced in Example 3 by the higher temperature than used in Example 4. The finer or thinner fibers cool more quickly and are thus disconnected from the heated roll sooner, causing shorter fibers than in Example 4.

While the invention has been shown and described in certain preferred embodiments it is realized that modifications can be made without departing from the spirit of the invention and it is to be understood that no limitations upon the invention are intended other than those imposed by the scope of the appended claims.

I claim:

1. A process for the manufacture of a multiplicity of elongated fiber-like projections on a flexible carrier surface to thereby provide a fur-like surface on the carrier surface from thermoplastic synthetic material of the type which becomes molten and sticky when sufficiently heated, which has a viscosity in the molten state such that it forms elongated fiber-like projections when two surfaces between which it is placed are pulled apart, and which is normally flexible in the temperature range of —20° C. to +70° C., comprising:
   (a) heating the thermoplastic material to above its melting temperature;
   (b) forming a molten layer of said heated thermoplastic material;
   (c) adhering one side of the molten layer to a substantially smooth surface having a minor affinity to the molten layer to thereby form a loose adhesion between the molten layer and the surface;
   (d) adhering the other side of the molten layer to the flexible carrier surface;
   (e) pulling the said one side of the molten layer away from the substantially smooth surface and forming, while pulling, a multiplicity of elongated fiber-like projections between the flexible carrier surface and the smooth surface wherein each fiber-like projection has a medial portion extending between an inner end portion connected to the flexible carrier surface and an outer end portion connected to the smooth surface;
   (f) while pulling said one side of the molten layer away from the smooth surface, blowing a stream of cool inert gaseous medium under low pressure against the multiplicity of fiber-like projections;
   (g) directing the stream of gaseous medium toward the medial portions of the fiber-like projections to thereby tension said fiber-like projections to impart further lengthening of the inner ends thereof while maintaining the inner ends of the fiber-like projections somewhat molten;
   (h) directing the stream of gaseous medium toward the outer end portions of the fiber-like projections to thereby cool said outer end portions and to sever the outer ends from the smooth surface to thereby produce a fur-like surface of elongated fibers having approximately the same diameter throughout the lengths thereof secured to the flexible carrier surface.

2. The process as set forth in claim 1 in which said thermoplastic synthetic material is heated to at least 10° C. above its melting point in step $a$.

3. The process as set forth in claim 1 in which the cooling stream of inert gaseous medium is directed at an angle in the range of 25–45° relative to the flexible carrier surface.

4. The process as set forth in claim 3 in which the cooling stream of inert gaseous medium is directed at a pressure in the range of 1 to 1.5 atmospheres.

5. The process as set forth in claim 1 in which the molten layer formed in step $b$ has a thickness in the range of .05 to .25 mm.

6. The process as set forth in claim 1 in which the molten layer, flexible carrier surface and substantially smooth surface move at a velocity in the approximate range of 2 to 5 meters per minute.

7. The process as set forth in claim 1 in which the heating step *a* includes passing a film of thermoplastic material into contact with a heated substantially smooth rotating surface to heat the film above its melting point.

8. The process as set forth in claim 1 in which the temperature of the stream of inert gaseous medium is approximately 20° C.

9. The process as set forth in claim 1 including directing the flexible carrier surface away from the substantially smooth surface at an acute departure angle, and increasing the departure angle to increase the length of the multiplicity of fiber-like projections.

References Cited

UNITED STATES PATENTS

| | | | |
|---|---|---|---|
| 3,390,403 | 6/1968 | Tilburg | 264—284 |
| 3,450,585 | 6/1969 | Takagi et al. | 264—164 |
| 3,399,425 | 9/1968 | Lemelson | 264—280 |
| 3,391,013 | 7/1968 | Videen | 264—139 |
| 3,379,807 | 4/1968 | McIntosh et al. | 264—162 |

ROBERT F. WHITE, Primary Examiner

J. R. THURLOW, Assistant Examiner

U.S. Cl. X.R.

264—47, 164, 167, 171, 175, 284, 335